Aug. 27, 1963 J. R. CORNELL 3,102,240

CATHODE-COUPLED PHANTASTRON SWEEP CIRCUIT HAVING TRANSISTOR MEANS FOR PROVIDING CONTROLLABLE PREMATURE SWEEP TERMINAION WITHOUT "BOTTOMING"

Filed Feb. 4, 1959

3 Sheets-Sheet 1

INVENTOR.
James R. Cornell
By Louis A. Kline
John T. Matlago
His Attorneys

CATHODE-COUPLED PHANTASTRON SWEEP CIRCUIT HAVING TRANSISTOR MEANS FOR PROVIDING CONTROLLABLE PREMATURE SWEEP TERMINAION WITHOUT "BOTTOMING"

Filed Feb. 4, 1959

INVENTOR:
James R. Cornell
By Louis A. Kline
John J. Matlago
His Attorneys

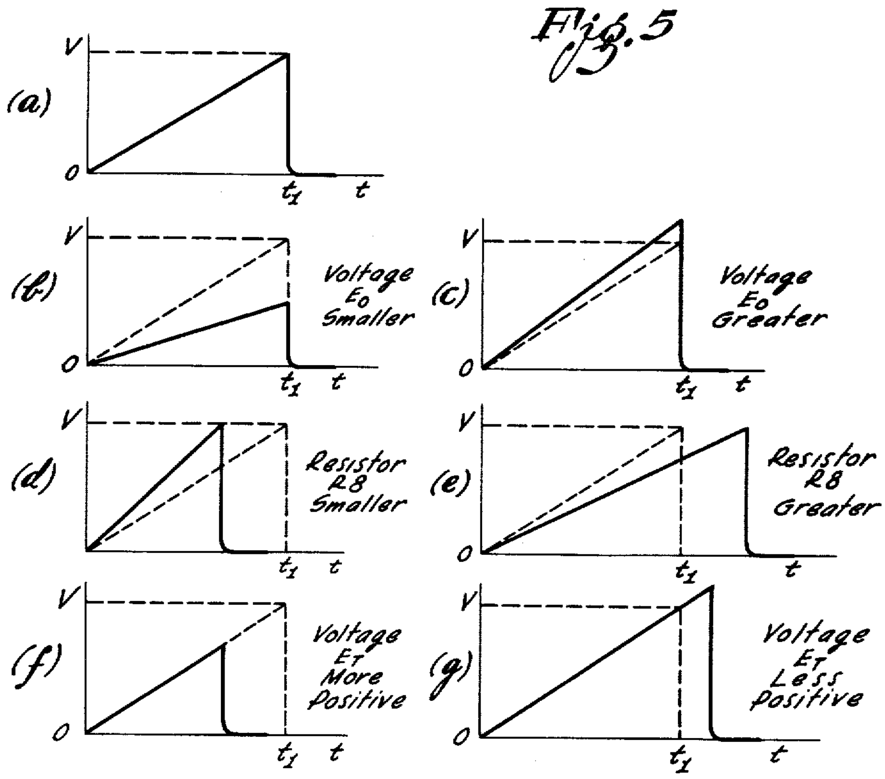
Fig. 6
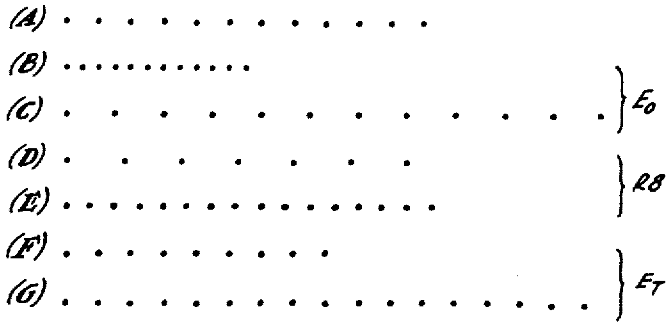
INVENTOR:
James R. Cornell
By Louis A Kline
John J. Matlago
His Attorneys United States Patent Office 3,102,240

Patented Aug. 27, 1963

3,102,240

CATHODE-COUPLED PHANTASTRON SWEEP CIRCUIT HAVING TRANSISTOR MEANS FOR PROVIDING CONTROLLABLE PREMATURE SWEEP TERMINATION WITHOUT "BOTTOMING"

James R. Cornell, Alondra, Calif., assignor to The National Cash Register Company, Dayton, Ohio, a corporation of Maryland Filed Feb. 4, 1959, Ser. No. 791,149

3 Claims. (Cl. 328—184)

This invention relates to phantastron circuits, and more particularly to an improved form of such circuits which provides a plurality of means for varying the parameters of the output waveform, thereby rendering the circuit more versatile than the conventional phantastron.

In the electronic arts the phantastron circuit is well known as a sweep circuit, providing an output waveform which varies substantially linearly for most of the duration of the output signal. The linearly varying portion of the output waveform may be isolated and amplified by further well-known circuit means to provide sweep voltages for a cathode ray tube. The conventional phantastron may provide means for varying the duration, and therefore the slope, of the output waveform, with the amplitude remaining constant. It also may provide means for varying the amplitude, and therefore the slope, of the output waveform, with the duration remaining constant. The circuit of the present invention adds further versatility to the phantastron circuit by providing means for varying the amplitude, and therefore the duration, with the slope remaining constant.

In some applications of sweep voltages to a cathode ray tube (CRT), and especially in studies of storage densities in data-storage tubes, it may be desirable to be able to terminate the sweep before it has completed a full scan, without affecting the normal velocity of the sweep. For example, in storing data on the face of a storage CRT, it may be desirable to scan only a portion of a "line" of storage areas of the storage surface, or to scan a line at higher or lower speeds, depending upon storage density. In order to have the normal density and rate of storing in the portion scanned, it is necessary that the sweep voltages exhibit their normal rates of change during the partial scan. A phantastron circuit which is provided with means to vary the amplitude, and therefore the duration, with the slope remaining constant, would be a suitable circuit for providing such sweep voltages.

In certain other CRT data-handling operations, wherein the electron beam may be required to scan lines of rasters of optical elements external to the tube and wherein the rasters may be of different configurations and dimensional characteristics and/or characterized by differing data-storage densities, and in which operations the "writing" or "reading" operations must necessarily be conducted in synchronism with, for example, computer clock and cyclic operations, it is required that the beam sweep rate, maximum deflection, and total sweep time, be separately variable. The circuits provided according to this invention possess these required capabilities.

It is therefore an object of this invention to provide a phantastron sweep circuit in which any two of the parameters of the output waveform, i.e., duration, slope, and amplitude, can be varied, while the third parameter is maintained constant. This and other objects will become apparent from the following description and the accompanying drawings in which:

FIG. 5 depicts voltage waveforms (*a*) to (*g*) which may be derived with the aid of the invention for use as horizontal sweep voltages in cathode ray tubes; and FIG. 6 depicts traces (A) to (G) which may appear on the fluorescent screen of a cathode ray tube under the control of the respective horizontal sweep voltages shown in FIG. 5.

Figure 1:
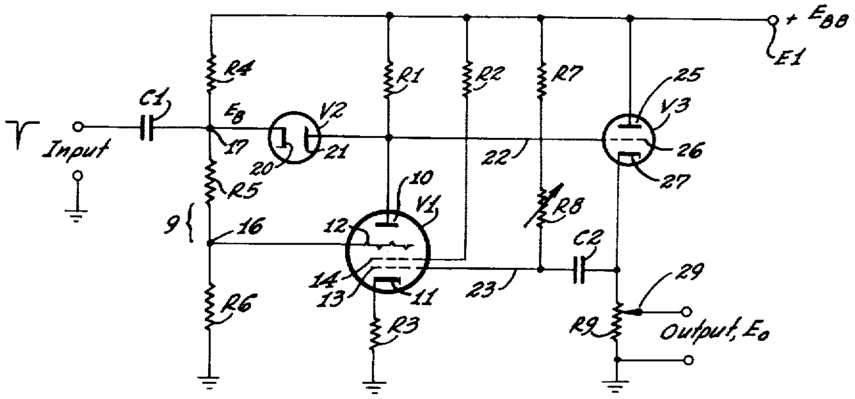
FIG. 1 shows a conventional phantastron circuit with a cathode follower.

In FIG. 1, V1 is the phantastron tube, such as 6AS6 pentode, for example, shown in a conventional cathode-coupled circuit. The plate 10 is connected to a high potential $E_{BB}$ derived from a source E1, through a load resistor R1. The screen grid 14 is similarly connected to $E_{BB}$ through a resistor R2. The cathode 11 is connected to ground through a cathode resistor R3. The suppressor grid 12 is connected to the lower tap 16 on a voltage-dividing network 9 comprising resistors R4, R5, and R6. An input capacitor C1 is connected to the upper tap 17 on the same voltage-dividing network 9. Also connected to the upper tap 17 is the cathode 20 of a diode V2, the anode 21 of which is connected to the plate 10 of V1. The cathode 20 of V2 is held at a potential $E_B$, lower than $E_{BB}$, by the voltage-dividing network 9. Consequently the plate 10 of V1 is also at approximately the same potential $E_B$ when the circuit is in its initial undisturbed state. The control grid 13 of V1 is connected to source E1 of potential $E_{BB}$ through the series connection of a fixed resistor R7 and a variable resistor R8. A feedback path 22, 23, is provided from the plate 10 of tube V1 to the control grid 13 thereof by way of a triode cathode follower V3. The plate 25 of V3 is connected directly to E1, the grid 26 is connected to the plate 10 of V1, and the cathode 27 is connected to the control grid 13 of V1 through a capacitor C2 and also to ground through a potentiometer R9. The input to the circuit is applied between C1 and ground, and the output voltage $E_0$ is obtained between a tap 29 on potentiometer R9, and ground.

The potentials on the electrodes of tube V1 of the circuit of FIG. 1 are such that in the initial undisturbed state the tube current is flowing through the screen resistor R2. Under that state the only current through the plate resistor R1 is that which flows through the diode V2.

Figure 2:
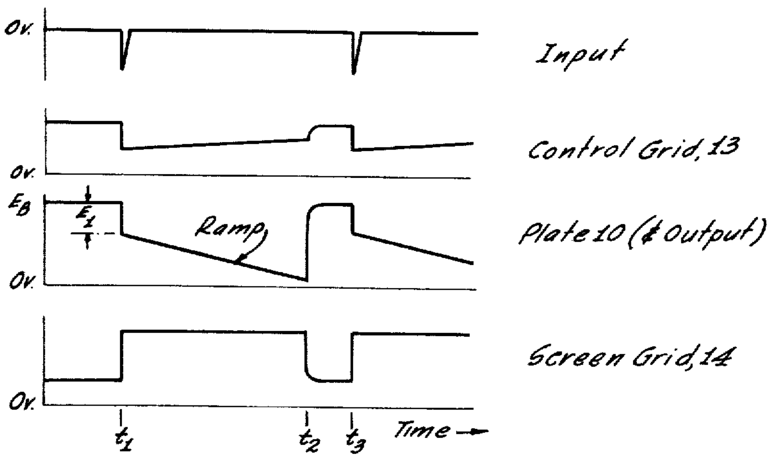
FIG. 2 shows waveforms appearing in the circuit of FIG. 1.

When a negative pulse is applied to capacitor C1, such as that illustrated at time $t_1$ in the input waveform of FIG. 2, which shows a plot of voltage versus time, the voltage at plate 10 of tube V1 decreases by the amount $E_1$, and the voltage at the control grid 13 decreases by almost the same amount, as indicated in FIG. 2 for the plate and the grid waveforms. The cathode current in tube V1 is decreased, the cathode voltage falls, and the suppressor grid 12 then diverts some of the tube current from the screen grid 14 to the plate 10. The voltage at plate 10 then falls steadily, as indicated by the ramp portion of the plate potential waveform of FIG. 2, as the plate current steadily increases. The voltage at control grid 13 increases slowly and the voltage at screen grid 14 remains fairly constant. At time $t_2$ the plate current has reached its maximum value and can increase no further. This condition is commonly referred to in the phantastron art as "bottoming." Being regenerative through capacitor C2 and tube V3, the circuit then rapidly resumes its initial condition, the rapidity of recovery being possible through the action of the cathode follower, which permits the voltage at plate 10 to recover almost immediately without the necessity of recharging capacitor C2 through the large-valued plate resistor R1. The circuit is then ready to be triggered again at time $t_3$ by the next trigger pulse of the input waveform. More detailed explanation of operations within the conventional phantastron circuits is set forth in the literature; and for example, in "Pulse and Digital Circuits" by Millman and Taub, pp. 221–228 incl., McGraw-Hill Book Company, Inc., New York City, New York.

The ramp portion of the plate waveform of FIG. 2 is linear to within about 0.1%. Its amplitude is determined by the parameters of the circuit of FIG. 1. The duration, i.e., the time from $t_1$ to $t_2$, and therefore the slope, are determined mainly by the combined value of resistors R7 and R8 and capacitor C2, with the maximum amplitude remaining constant.

The output waveform, appearing between ground and the variable tap on potentiometer R9, is similar in form to the plate waveform of V1. The duration of the output waveform is not affected by potentiometer R9; however, the amplitude, and therefore the slope, of the output waveform, depend on the setting of the tap 29 on potentiometer R9.

It is therefore seen that, in a conventional phantastron, the output waveform can be varied in two ways. The amplitude, and therefore the slope, can be altered, with the duration constant, by varying potentiometer R9, on the one hand; on the other hand, the duration, and therefore the slope, can be altered, with the amplitude constant, by varying resistor R8. For the various special requirements, as mentioned earlier, it is highly desirable to have a third means of varying the output waveform, i.e., to be able to vary the amplitude, and therefore the duration, with the slope constant. The circuits of FIGS. 3 and 4 provide means for obtaining the third method of control, and will be explained in connection with exemplary operations in "writing" spot configurations of various densities and lengths on the face of a CRT supplied with computer "clock" control pulses.

The conventional circuit of FIG. 1 "resets," i.e., returns to its initial state, at time $t_2$, when the plate current can no longer increase. The present invention as illustraed by the embodiments of FIG. 3 and FIG. 4, contemplates the provision of an amplitude-sensitive circuit, which, at a given adjustable amplitude of the output waveform, will automatically cause the circuit to reset "prematurely" (that is, prior to "bottoming"), thereby controlling the amplitude, and therefore the duration, with the slope remaining consant.

Figures 3, 4:
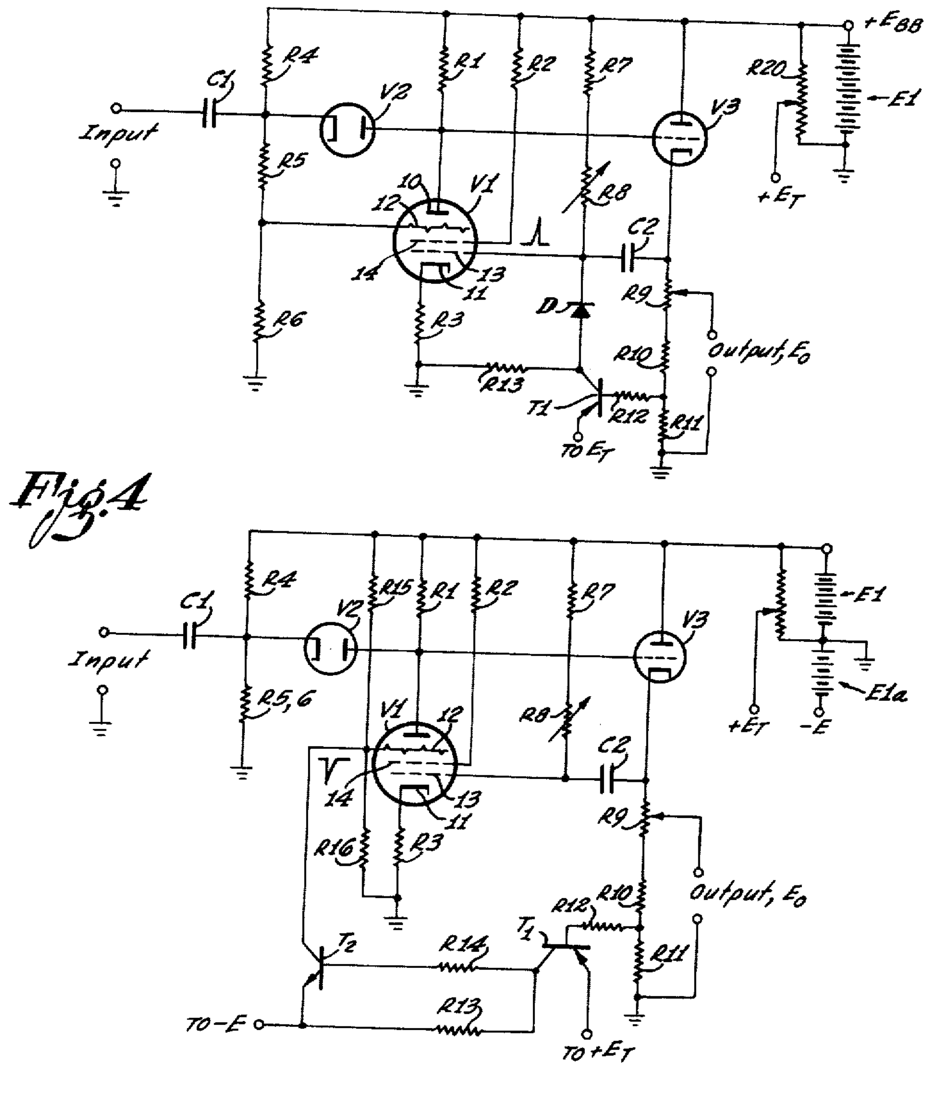
FIG. 3 shows the circuit of FIG. 1 modified in accordance with the invention.
FIG. 4 shows another modification of the circuit of FIG. 1 in accordance with the invention.

In FIGS. 3 and 4, V1, V2, and V3 function the same as in the circuit of FIG. 1, and the corresponding resistors and capacitors are correspondingly numbered. In series with potentiometer R9, however, is a voltage-dividing network comprising resistors R10 and R11, to the junction of which is connected the base of a PNP transistor T1 through a current-limiting resistor R12. The emitter of T1 is connected to a source of positive potential $E_T$, which may be, for example, derived at a suitable tap on a voltage-dividing network or potentiometer R20 connected between the high potential source E1 (of potential $E_{BB}$), and ground, as indicated. The collector of transistor T1 is connected to one end of a resistor R13. In the circuit arrangement shown in FIG. 3, the other end of resistor R13 is shown connected to ground. In the circuit arrangement shown in FIG. 4, the other end of resistor R13 is shown connected to a negative voltage, −E, which may be supplied from a terminal on a source E1*a* forming an extension of source E1.

Transistor T1, and resistors R10 to R13 comprise an amplitude-sensitive network. When the falling voltage on the base of T1 becomes less than the voltage on the emitter, as determined by $E_T$, T1 conducts and the potential on the collector rises abruptly. In the circuit arrangement of FIG. 3, a diode D is shown having its anode connected to the collector of T1 and its cathode connected to the control grid 13 of V1. When T1 conducts, the abrupt rise of potential on the collector is supplied by way of diode D to the control grid 13 of V1, causing the phantastron circuit to reset earlier than it otherwise would, or prematurely, as desired. The potential $E_T$, which is adjustable through the tap of potentiometer R20, thus controls the amplitude of the output wave at which resetting occurs, and therefore controls the duration of the output waveform at constant slope.

The action of the circuit of FIG. 4 differs from that of the circuit of FIG. 3 in that the rise of potential on the collector of transistor T1 is employed to initiate resetting through action on the suppressor grid 12 of tube V1. In FIG. 4 the suppressor grid 12 is shown connected to a separate voltage-dividing network comprising resistors R15 and R16 between $E_{BB}$ and ground. Also, the collector of transistor T1 is shown connected to the base of a second transistor T2, through a current-limiting resistor R14. The emitter of T2 is connected to the negative voltage −E, supplied at the terminal of E1*a*, and the collector is connected to the suppressor grid 12 of V1. Transistor T2 is an NPN transistor and is normally not conducting. When transistor T1 conducts in the manner previously explained, the voltage on the base of T2 rises and T2 conducts. The collector of T2 thereupon abruptly becomes negative, cutting off the plate current of V1 and causing the phantastron circuit to reset. Thus, the potential $E_T$ has the same function in the circuit of FIG. 4 as in the circuit of FIG. 3.

The ramp portion of the plate waveform of FIG. 2 may easily be isolated, inverted, amplified, by means well known in the art, to produce voltage waveforms as shown in FIG. 5, which shows plots of voltage versus time. Waveform (*a*) may be taken as a typical sweep voltage produced with mid-range settings of R8, R9, and $E_T$, and is shown as increasing linearly from 0 to voltage V in the time interval from 0 to $t_1$. Trace (A) of FIG. 6 shows the trace which may appear on the face of a CRT as a result of applying the voltage waveform (*a*) of FIG. 5 to the horizontal deflection plates of the CRT. The heavy dots appearing at equal intervals on trace (A) indicate momentary increases of brilliance of the trace, which may be obtained by applying a train of regularly time-spaced positive pulses, such as computer clock pulses to the control grid. In either case the beam intensity of the CRT is regularly altered by potentials supplied by a suitable continuously operating pulse generator. In practice, since such dots may represent information to be stored in a memory which comprises discrete islands of a phosphor deposited in a matrix on the face of a CRT, there may be hundreds of such momentary increases in brilliance in each line trace of the electron beam. However, for convenience, only twelve dots are shown on trace (A), representing a line of an exemplary simple raster.

Waveforms (*b*) and (*c*) of FIG. 5 show the effect of varying the tap on potentiometer R9 so as to decrease and increase, respectively, the output voltage $E_0$. With $E_0$ smaller, a waveform (*b*) (solid line) of lower amplitude is obtained, and with $E_0$ greater, a waveform (*c*) (solid line) of greater amplitude is obtained. Waveform (*a*) is reproduced in waveforms (*b*) to (*g*) in broken outline for comparison. Waveforms (*b*) and (*c*) have the same duration $t_1$ as waveform (*a*).

Trace (B) in FIG. 6 shows the effect of decreasing the output voltage $E_0$; the length of the trace has decreased. Trace (C) shows an increase in length, corresponding to an increase in $E_0$. Traces (B) and (C) still have twelve dots each, however, since the sweep voltages (*b*) and (*c*) have the same duration as sweep (*a*).

Waveforms (*d*) and (*e*) shows the effect of varying resistor R8, with R8 made smaller and greater, respectively. Waveforms (*d*) and (*e*) have the same amplitude V as waveform (*a*), but the durations are shorter and longer respectively. The respective effects on the trace are shown by traces (D) and (E) of FIG. 6. These have the same length as trace (A), but trace (D) shows fewer dots and trace (E) shows more dots, than trace (A). The duration of the sweep voltage, of course, determines how many times the trace will be brightened by the regularly occurring positive "clock" pulses applied on the control grid of the CRT.

Waveforms (*d*) and (*e*) show the effect of varying varying $E_T$, the potential on the emitter of T1, with $E_T$ being more positive and less positive respectively. Waveforms (*f*) and (*g*) have the same slope as waveform (*a*) but the durations are respectively shorter and longer. The effects are shown on traces (F) and (G) respectively, (F) being shorter because the amplitude of sweep (*f*) is less, and (G) being longer because the amplitude of sweep (*g*) is greater, than the amplitude of sweep (*a*). However, since the slopes of sweeps (*f*) and (*g*) are the same as the slope of sweep (*a*), the spacings of the dots on traces (F) and (G) are the same as the spacings of the dots on sweep (*a*).

From FIGS. 5 and 6 it is therefore seen that varying voltage $E_0$ changes the length of the trace on the CRT, with the number of dots remaining constant. It is also seen that varying the value of resistor R8 changes the number of dots on the trace, with the length of the trace remaining constant, and that varying voltage $E_T$ changes the length of the trace with the spacings of the dots remaining constant.

By connecting the emitter of transistor T1 to an appropriate control circuit, the potential $E_T$ on the emitter can be made to vary according to some desired scheme. The amplitude and the duration of the output waveform $E_0$ would then vary according to the variation of $E_T$.

From the preceding explanation and description of an exemplary physical embodiment of the invention, it has been made evident that a phantastron circuit device or means has been provided which has means for adjusting the time rate of change of the linearly variable output potential waveform of a phantastron circuit and means for independently varying the output potential amplitude at which the phantastron will reset, whereby both the amplitude and the time rate of change of the circuit output potential wave may be adjusted each independently of the other. These meritorious results are secured by the combination with a conventional phantastron circuit of a means including a control circuit means which applies to the phantastron circuit a resetting potential which is not directly derived from the output potential waveform but which is adjustably related thereto. In one type of control circuit the resetting potential is a positive potential applied to a control grid of the electron tube of the phantastron circuit; and in another type of control circuit the resetting potential is a negative potential applied to the suppressor grid of the electron tube. The description makes evident the manner in which types of phantastron circuits other than the exemplary cathode-coupled circuit shown, may be made to produce output waveforms whose amplitude and time rate of change are independently variable.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. A cathode-coupled phantastron sweep circuit comprising a cathode-coupled phantastron for generating a sweep in response to an applied input signal, and controllable amplitude-sensitive means for prematurely terminating the sweep of said phantastron at an adjustable predetermined time without "bottoming"; said phantastron comprising an electron tube having elements including a plate, a cathode, a control grid, a screen grid, and a suppressor grid, and circuit means coupled to the elements of said electron tube for providing cathode-coupled phantastron operation, said circuit means including an impedance connected in the cathode circuit of said electron tube and feedback means including an integrating capacitor coupled between said plate and said control grid; said amplitude-sensitive controllable means comprising at least one transistor, first circuit means coupling the input of said transistor to said phantastron so as to be responsive to the sweep generated thereby, second circuit means coupling the output of said transistor to one of the control and suppressor grids of said electron tube, and third circuit means coupled to said transistor to cause said transistor to remain non-conducting until the sweep of said phantastron arrives at a predetermined potential, whereupon said transistor will conduct to cause a signal to be applied to one of the control and suppressor grids so as to reset said phantastron without "bottoming."

2. A cathode-coupled phantastron sweep circuit comprising a cathode-coupled phantastron for generating a sweep in response to an applied input signal, and controllable amplitude-sensitive means for prematurely terminating the sweep of said phantastron at an adjustable predetermined time without "bottoming"; said phantastron comprising an electron tube having elements including a plate, a cathode, a control grid, a screen grid, and a suppressor grid, circuit means coupled to the elements of said electron tube for providing cathode-coupled phantastron operation, said circuit means including an impedance connected in the cathode circuit of said electron tube and feedback means including a cathode follower and an integrating capacitor coupled between said plate and said control grid; said controllable amplitude-sensitive means comprising a transistor having an emitter, a base and a collector, said base being coupled to the output of said cathode follower, said emitter being coupled to an adjustable control potential, and said collector being coupled to said control grid, and circuit means coupled to said transistor so that said transistor remains non-conducting until the sweep of said phantastron reaches a predetermined potential determined by said adjustable control potential, whereupon said transistor will conduct and apply a signal to said control grid so as to reset said phantastron without "bottoming."

3. A cathode-coupled phantastron sweep circuit comprising a cathode-coupled phantastron for generating a sweep in response to an applied input signal, and controllable amplitude-sensitive means for prematurely terminating the sweep of said phantastron at an adjustable predetermined time without "bottoming"; said phantastron comprising an electron tube having elements including a plate, a cathode, a control grid, a screen grid, and a suppressor grid, circuit means coupled to the elements of said electron tube for providing cathode-coupled phantastron operation, said circuit means including an impedance connected in the cathode circuit of said electron tube and feedback means including a cathode follower and an integrating capacitor coupled between said plate and said control grid; said controllable amplitude-sensitive means including a PNP transistor and an NPN transistor each having an emitter, a base and a collector, the base of the PNP transistor being coupled to the output of said cathode follower, the emitter of the PNP transistor being coupled to an adjustable control potential, the collector of the PNP transistor being coupled to the base of the NPN transistor, the emitter of the NPN transistor being coupled to a fixed potential, and the collector of the NPN transistor being coupled to said suppressor grid, and circuit means coupled to said transistors so that they remain non-conducting until the sweep of said phantastron reaches a predetermined potential determined by said adjustable control potential, whereupon said PNP transistor will conduct to cause said NPN transistor to conduct and apply a signal to said suppressor grid so as to reset said phantastron without "bottoming."

References Cited in the file of this patent

UNITED STATES PATENTS 2,824,960 Cordry ---------------- Feb. 25, 1958

OTHER REFERENCES

M.I.T. Radiation Laboratory Series, vol. 19, Waveforms, Chance et al., pages 287, 288 (published by McGraw-Hill, 1949).

UNITED STATES PATENT OFFICE

CERTIFICATE OF CORRECTION

Patent No. 3,102,240 August 27, 1963

James R. Cornell

It is hereby certified that error appears in the above numbered patent requiring correction and that the said Letters Patent should read as corrected below.

Column 5, line 19, strike out "Waveforms (d) and (e) show the effect of varying" and insert instead -- Waveforms (f) and (g) of FIG. 5 show the effect of --.

Signed and sealed this 31st day of March 1964.

(SEAL)
Attest:
ERNEST W. SWIDER

Attesting Officer

EDWARD J. BRENNER

Commissioner of Patents